Patented May 24, 1932

1,859,529

UNITED STATES PATENT OFFICE

HANS RATHSBURG, OF FURTH, NEAR NUREMBERG, GERMANY

PROCESS FOR THE MANUFACTURE OF TETRAZENE EXPLOSIVES

No Drawing. Application filed April 5, 1929, Serial No. 352,892, and in Germany March 16, 1928.

This invention relates to the manufacture of tetrazene explosives.

Guanylnitrosaminoguanyltetrazene of the empiric formula $C_2H_8ON_{10}$ may be employed as an explosive component in detonating sets (as per German patent specification No. 362,433).

It has been produced as a scientific compound first by K. A. Hofmann and R. Roth (Berichte der Deutschen Chemischen Gesellschaft 43/1910, 685). These authors added 7 g. sodium nitrate to a highly saturated solution of 10 g. aminoguanidine nitrate in 90 ccm. water while cooling whereupon the composition was shaken and left standing. After 12 hours the precipitation of the tetrazene began and was finished after 40 hours. The output was 6, 5 g. corresponding to 96% of the theoretical.

The reaction liquid of cyanamid salts, as per example sodium or calcium salts (calcium cyanamid $CaCN_2$) containing aminoguanidinesulphate with hydrazinesulphate also may be used for directly precipitating the tetrazene by simply adding sodium nitrate.

If it is desired to precipitate larger quantities of tetrazene a very long time would be necessary. When using 3 kg. of aminoguanidine-salt a complete precipitation would be secured only after several days. This length of time for the complete precipitation may be shortened very much if the process is performed while heating i. e. to about 60° C. and while agitating, contrary to the prescription in the reports. But this process has the drawback that the reaction takes place under development of very much nitrogen and very turbulently. The output is then correspondingly insignificant.

Now I have found that the positive heat-effect of the chemical process occurring in the reaction of aminoguanidine-salts, as per example aminoguanidine-nitrate or chloride or sulphate with sodium nitrite will be sufficient for accomplishing the precipitation of the tetrazene in a relatively short time with a good output. For this purpose the two reaction liquids i. e. the solution of aminoguanidine-salt and sodium nitrite are heated to say 25–30° C. according to the season and having this temperature they are mixed. If by application of vessel lagging or insulating means, such as wood-wool, asbestos or silicious marl the reaction liquid is protected against loss of heat by radiation the temperature rises up to 40–50° C. and the process proceeds quickly and quietly under development of nitrogen, and the tetrazene precipitates in a loadable crystalline form. When 40–50° C. are reached the reaction jar, as per example a glass balloon is cooled by the air or in the warmer season by water so that the reaction is slackened. When using 3 kg. aminoguanidine-salt the process is finished after 3–4 hours.

The following is an example of a manner of performance:

3 kg. aminoguanidine-sulphate are dissolved in 10–20 liters of warm water and delivered from impurities. This filtered solution heated to 25–35° C. if necessary is added to a heated solution of 1,8–2 kg. sodium nitrite in 6 liters of water. The process itself proceeds in the manner as described above. A mechanical stirring up is not necessary because on account of the turbulent development of gas the reaction liquid is mixed thoroughly in a sufficient manner.

It will be readily understood that I do not limit myself to the proportions stated as these may be varied within the ambit of the claims without departing from the spirit of my invention.

*Example 1. Theoretical course of the process*

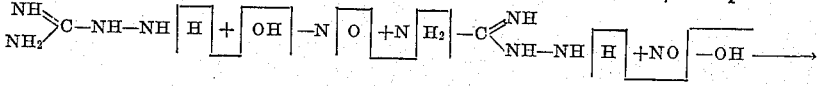

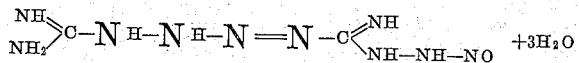

*Example 2. Practical carrying out of the process*

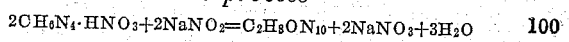

*Example 3. Practical carrying out of the process*

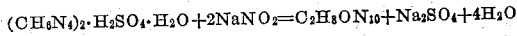

What I claim as my invention and desire to secure by United States Letters Patent is:

1. The process for the manufacture of tetrazene-explosives which consists in assembling preheated aqueous solutions of an amino-guanidine-salt and of sodium nitrite in a reaction jar so that they will act one upon another.

2. The process for the manufacture of tetrazene-explosives which consists in assembling preheated aqueous solutions of an aminoguanidine-salt and of sodium nitrite in a reaction jar the heat effect occurring in the reaction being used for the precipitation of the tetrazene and the reaction liquid being protected against the loss of heat by radiation by insulating the reaction jar.

3. The process for the manufacture of tetrazene-explosives which consists in assembling preheated aqueous solutions of an amino-guanidine-salt and of sodium nitrite in a reaction jar the heat effect occurring in the reaction being used for the precipitation of the tetrazene the reaction liquid being protected against loss of heat by radiation but the reaction jar being cooled when the reaction liquid has reached 40–50° C. in order to slacken the reaction.

In testimony whereof I have affixed my signature.

HANS RATHSBURG.